3,284,514
PROCESS FOR THE HYDRODEALKYLATION OF A POLYALKYLATED PHENOL
Jonas Dedinas, Pittsburgh, Alfred M. Henke, Springdale, and William C. Offutt, Pittsburgh, Pa., assignors to Gulf Research & Development Company, Pittsburgh, Pa., a corporation of Delaware
Filed Dec. 19, 1962, Ser. No. 245,892
2 Claims. (Cl. 260—621)

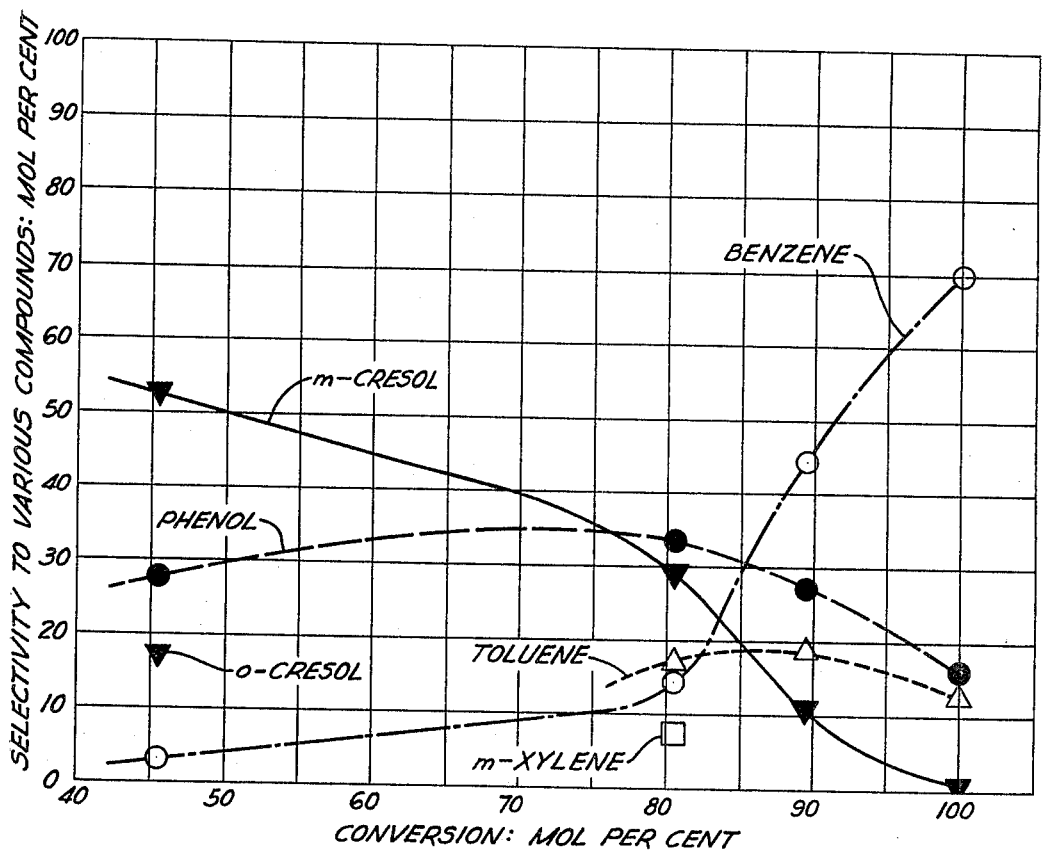

This invention relates to a process for the thermal hydrodealkylation of a polyalkylated phenol, such as xylenols, to obtain phenols.

Alkyl aromatics such as toluene, can be dealkylated to lighter aromatics, such as benzene, by subjecting such alkyl aromatic in the presence of hydrogen but in the absence of catalyst to an elevated temperature and an elevated pressure for a controlled length of time. As a result of such reaction conditions the alkyl group is cleaved from the alkyl aromatic and combines with the hydrogen present to form a saturated aliphatic hydrocarbon. The desired aromatic can be separated from the saturated aliphatic hydrocarbon and unreacted alkyl aromatic, if present, in any convenient manner.

When a polkalkylate phenol, such as xylenol, is similarly subjected to thermal hydrodealkylation, not only are alkyl substituents removed and the same results noted above obtained, but there is also a tendency for the hydroxyl group to be cleaved from the aromatic ring and be replaced with a hydrogen. The hydroxyl group so removed combines with another hydrogen to form water. Accordingly a polyalkylated phenol, under such circumstances, will be converted to benzene instead of phenol and a large amount of water will be formed.

We have found that a polyalkylated phenol, such as a xylenol, can be dealkylated and maximum selectivity to phenol obtained by converting no more than about 75 to about 80 mol percent, preferably no more than about 78 mol percent, of the polyalkylated phenol subject to thermal hydrodealkylation. Amounts of polyalkylated phenols below the defined amount can be converted and good selectivity to phenol will result when polyalkylated phenols are heated at elevated temperatures defined herein in the presence of hydrogen, although we prefer to convert on a minimum basis about 25 to about 35 mol percent of the polyalkylated phenol.

The reaction product at the end of the conversion period will contain phenol, monoalkylated phenols such as cresols, mono, and in some instances, polyalkylated benzenes such as toluene and m-xylene, respectively, benzene, water, saturated aliphatic hydrocarbons and unreacted polyalkylated phenols and hydrogen. An attractive embodiment of our invention envisions recovering phenol from the reaction product and thereafter subjecting the monoalkylated phenols to thermal hydrodealkylation to obtain additional phenol. Additionally and/or alternatively the alkyl benzenes, such as toluene and xylenes, can also be subjected to thermal hydrodealkylation, as set forth above, to obtain additional benzene. An additional embodiment of our invention involves recovering cresols as one of the desired products.

In order to carry out the reaction the charge, polyalkylated phenols such as 2,4- 2,5-, 3,4- and 3,5-xylenols and 2,3,5-trimethylphenol and hydrogen, together or separately, are first preheated to reaction temperature in any tubular member in indirect contact with heat producing a tubular member in indirect conduct with heat producing elements such as burners. The amount of hydrogen which must be present in the charge must be that sufficient to replace the alkyl chain and hydroxyl group cleaved from the aromatic ring at the elevated reaction temperature and also to combine with the alkyl chain and hydroxyl group so removed to form a saturated aliphatic hydrocarbon and water, respectively. In general while the molar ratio of hydrogen to polyalkylated phenol can vary over a wide range a molar ratio of about two to about 10 is preferred.

Any type of reactor, but preferably a tubular reactor, heated, for example, in the same manner as the preheater described above, can be employed. The walls of the reactor should be free of material which will catalyze the thermal dealkylation procedure defined herein, and the interior of the reactor should similarly be free of catalytic material. If desired the reactor can be filled with non-catalytic material, such as quartz chips, in order to effect better mixing and to reduce temperature gradients therein.

The temperature required to effect the desired hydrodealkylation can be from about 900° to about 1600° F., preferably from about 1000° to about 1400° F. While pressure is not critical and can be in excess of about 1500 pounds per square inch gauge, we prefer to employ a pressure in the range of about 200 to about 1000 pounds per square inch gauge. A space velocity of at least about 0.2, preferably about 0.5 to about 3.5 (total volume of polyalkylated phenol free reactor volume per hour) can be employed.

The reaction is continued and then terminated, as noted hereinabove, when no more than about 75 to about 80 mol percent of the polyalkylated phenol has been converted. To terminate the reaction the reaction mixture is quenched to a temperature where the reaction essentially ceases, which can be from about 80° to about 800° F., in any suitable manner, for example, by direct contact with cooled, previously-formed product.

Maximum selectivity of polyalkylated phenol to phenol has been obtained in the product so recovered. The product obtained consists essentially of phenol, monoalkylated phenols such as cresols, mono, and in some instances, polyalkylated benzenes such as toluene and m-xylene, respectively, benzene, water, saturated aliphatic hydrocarbons, unreacted polyalkylated phenols and hydrogen and some heavy material believed to be conjugated phenols and aromatics. To recover the phenol and, if desired cresol, this product can be treated in any suitable manner to remove water therefrom, for example by passing the same through 4A Linde molecular sieves or other adsorbent material having a greater specificity for water than the hydrocarbons or phenols. The remaining product for purposes of recovery can be separated into its individual components or selected combinations thereof by any suitable means, for example, by fractional distillation at selected temperatures within a range of about 170° to about 410° F. at atmospheric pressure.

An extremely attractive feature of our present process is that while the process can be operated to obtain, in a single stage, maximum selectivity to phenol and mono-alkylated phenols such as cresols, alkylated benzenes produced can be further treated to produce additional benzene. If desired the monoalkylated phenols can be further subjected to thermal hydrodealkylation to convert the same to phenol.

Thus after the phenol, monoalkylated phenols, water, saturated aliphatic hydrocarbon, and unreacted polyalkylated phenol and hydrogen, and, if desired benzene, are removed from the reaction product, the product remaining, mono- and polyalkylated benzenes, such as toluene and m-xylene, respectively, and benzene, if not previously removed, are treated at a temperature of about 1050° to about 1350° F. and a pressure of about 250 to about 1200 pounds per square inch gauge at a space velocity of about 0.5 to about three in the presence of about two to about 10 mols of hydrogen per combined mols of alkylated benzene. As a result thereof the alkylated benzenes will be converted to benzene and saturated aliphatic hydrocarbon. The product can be quenched to a temperature in the range of about 80° to about 800° F. in any suitable manner, and the benzene recovered therefrom by fractional distillation at a temperature of about 170° to about 240° F. at atmospheric pressure.

If desired, the monoalkylated phenols, such as cresols obtained herein can be further subjected to thermal hydrodealkylation in the manner described and claimed in our copending application Serial No. 245,848 filed concurrently herewith. In accordance with the teaching of our latter application the monoalkylated phenols are treated at a temperature of about 900° to about 1600° F. and a pressure of about 100 to about 1000 pounds per square inch gauge using a space velocity of about 0.2 to about 3.5 until no more than 88 to about 92 mol percent thereof are converted. Under these conditions maximum selectivity to phenol is obtained. Some of the monoalkylated phenol charge is also converted to toluene and benzene. The toluene so obtained can, in turn, be subjected to thermal hydrodealkylation in the manner noted in said application to obtain benzene. The process so operated will result in maximum selectivity of polyalkylated phenols to the desired compounds phenol and benzene.

The process of this invention can be further illustrated by reference to the following. Thermal hydrodealkylation runs were made, using as charge therefor cresylic acid, in a reactor having a length of four inches and an inner diameter of one inch filled with a non-catalytic material, quartz chips, to effect better mixing and to reduce temperature gradients. Cresylic acid employed contained 5.5 percent by weight of 2,4- and 2,5-xylenol, 55.3 percent by weight of 3,5-xylenol and 19.3 percent by weight of 3,4-xylenol, 11.5 percent by weight of 2,3,5-trimethylphenol, 0.9 percent by weight of ortho cresol, 4.4 percent by weight of combined meta- and para-cresols and 2.5 percent by weight of phenol. The charge stock in each run was mixed with hydrogen before preheating. The average reactor temperature was determined from several temperature measurements made inside the reactor with a movable chromel-alumel thermocouple. Pressures and temperatures were maintained at set values by means of automatic control instruments. The unit was run two hours off-stream to allow for stabilization of process conditions. Subsequently, a two to four hour on-stream period was made during which product was collected and process conditions were maintained constant. The results obtained are tabulated below in Table I.

*Table I*

| Run No. | 1 | 2 | 3 | 4 |
|---|---|---|---|---|
| Duration of On-Stream Period, Hrs. | 3 | 2 | 3 | 3 |
| Conditions: | | | | |
| Temperature, °F | 1,152 | 1,249 | 1,252 | 1,352 |
| Pressure, p.s.i.g., 450. | | | | |
| Space Velocity, Vol./Hr./Vol. | 1.0 | 2.0 | 1.0 | 1.0 |
| Hydrogen/Cresylic Acid, Mol./Mol. | 3.8 | 3.8 | 3.8 | 3.8 |
| Conversion, Mol Percent (to Benzene Toluene, Xylenes, Phenol, Cresols) | 45.1 | 80.3 | 89.4 | 100.0 |
| Selectivity, Mol Percent: | | | | |
| Benzene | 3.5 | 13.8 | 44.1 | 70.0 |
| Toluene | 0.0 | 16.4 | 18.1 | 12.1 |
| m-Xylene | 0.0 | 7.4 | 0.0 | 0.0 |
| Phenol | 27.2 | 33.1 | 27.3 | 16.1 |
| o-Cresol | 16.7 | 0.0 | 0.0 | 0.0 |
| m-Cresol | 52.2 | 29.3 | 10.6 | 1.8 |
| Retention of Hydroxyl Group, Mol Percent | 96.4 | 62.4 | 37.9 | 17.9 |

The data from Table I are graphically represented in the drawing. The drawing clearly shows that maximum selectivity of polyalkylated phenol to phenol itself was obtained when about 75 to about 80 mol percent of the charge was converted. Some toluene and some benzene were also formed. When the conversion of charge was in excess of the defined amount selectivity to phenol was reduced appreciably and overall retention of the hydroxyl group was adversely affected and the amount of benzene produced increased appreciably. While selectivity to phenol itself was somewhat reduced maximum retention of the hydroxyl group on the phenol charge was obtained when the conversion of charge was below the defined amount and was maintained at about 43 mol percent conversion.

The hydrogen employed in the thermal hydrodealkylation process defined herein need not be pure but may be present in a gaseous stream also containing materials which will not adversely affect the desired reaction. Coke oven gas, for example, can advantageously be employed for purposes of supplying hydrogen for the reaction. The composition of coke oven gas, in mol percent, is as follows: 53.1 percent hydrogen, 26.2 percent methane, 5.3 percent ethane and ethylene, 0.4 percent heavier hydrocarbons, 5.8 percent carbon monoxide, 2.8 percent carbon dioxide, 0.5 percent hydrogen sulphide and 5.9 percent nitrogen. Since the hydrogen in such stream is consumed in the process and a saturated aliphatic hydrocarbon, such as methane, is formed, the resultant gas will contain more saturated aliphatic hydrocarbon and less hydrogen than the charge gas. Since on a volume basis the saturated aliphatic hydrocarbon has a higher caloric value than hydrogen, the resultant gas will have an enhanced caloric value. For such reason in some cases an impure hydrogen stream is desirable as a source of hydrogen.

Obviously many modifications and variations of the invention, as hereinabove set forth, can be made without departing from the spirit and scope thereof, and only such limitations should be imposed as are indicated in the appended claims.

We claim:

1. A process for converting a polyalkylated phenol which comprises reacting a polymethyl phenol with at least about two mols per mol thereof of hydrogen at a temperature of about 900° to about 1600° F. at a space velocity of about 0.2 to about 3.5, terminating said reaction when about 75 to about 80 mol percent of said polyalkylated phenol has been converted and thereafter recovering phenol from the reaction product.

2. A process for converting a xylenol which comprises reacting a xylenol with at least about two mols per mol thereof of hydrogen at a temperature of about 900° to about 1600° F. at a space velocity of about 0.2 to about 3.5, terminating said reaction when about 75 to about 80 mol percent of said xylenol has been converted and thereafter recovering phenol from the reaction product.

References Cited by the Examiner

UNITED STATES PATENTS

| 1,947,648 | 2/1934 | Hofmann et al. | 260—621 |
| 2,003,941 | 6/1935 | Kahl | 260—621 |
| 3,182,094 | 5/1965 | Glazier et al. | 260—672 |

FOREIGN PATENTS 657,207  3/1938  Germany.

OTHER REFERENCES

Ellis: Hydrogenation of Organic Substances (3rd ed., 1930), p. 510.

Egloff: Reactions of Pure Hydrocarbons (1937), p. 542.

LEON ZITVER, *Primary Examiner.*

HAROLD G. MOORE, *Examiner.*

D. M. HELFER, *Assistant Examiner.*